United States Patent [19]

Nusbaum

[11] Patent Number: 4,995,774
[45] Date of Patent: Feb. 26, 1991

[54] SIDE-LOADING FORK LIFT VEHICLE

[75] Inventor: Howard G. Nusbaum, Brooklyn, N.Y.

[73] Assignee: Robert R. Gerzel, Orlando, Fla.

[21] Appl. No.: 342,999

[22] Filed: Apr. 25, 1989

[51] Int. Cl.⁵ ............................ B62D 1/00; B66F 9/00
[52] U.S. Cl. ..................................... 414/544; 180/234; 280/91; 280/43.24; 414/282; 414/541; 414/635; 414/665
[58] Field of Search ............... 180/233, 234, 236, 242, 180/140; 280/43.23, 43.24, 91; 414/281, 282, 495, 540, 541, 544, 595, 631, 634, 635, 663, 664, 665, 632

[56] References Cited

U.S. PATENT DOCUMENTS

| | | | |
|---|---|---|---|
| 2,165,617 | 7/1939 | DeOliveira Paes et al. | 280/43.23 |
| 2,591,544 | 4/1952 | Hegarty . | |
| 2,621,811 | 12/1952 | Lull . | |
| 2,715,534 | 8/1955 | Hoge et al. | 280/91 |
| 2,796,187 | 6/1957 | Girardi . | |
| 2,829,785 | 4/1958 | Pitts | 414/541 |
| 2,875,842 | 3/1959 | Morrell | 280/91 X |
| 2,897,985 | 8/1959 | Carlson et al. . | |
| 2,929,524 | 3/1960 | Carlson et al. . | |
| 3,031,091 | 4/1962 | Erickson et al. . | |
| 3,067,839 | 12/1962 | Gibson | 280/91 |
| 3,087,564 | 4/1963 | Quayle | 280/91 |
| 3,167,201 | 1/1965 | Quayle . | |
| 3,168,956 | 2/1965 | Jinks et al. . | |
| 3,199,696 | 8/1965 | Chrysler et al. . | |
| 3,556,241 | 1/1971 | Mitchell | 280/91 X |
| 3,595,409 | 7/1971 | Bowman-Shaw | 414/544 |
| 3,739,931 | 6/1973 | Bowman-Shaw . | |
| 3,785,515 | 1/1974 | Shaffer . | |
| 3,958,703 | 5/1976 | Marco et al. . | |
| 3,972,434 | 8/1976 | Mecklenburg et al. . | |
| 4,119,210 | 10/1978 | Desourdy | 414/495 X |
| 4,263,979 | 4/1981 | Sturgill | 280/91 X |
| 4,339,139 | 7/1982 | Swanson | 280/43.23 |
| 4,355,947 | 10/1982 | Wiblin . | |
| 4,373,603 | 2/1983 | Nelson | 180/236 |
| 4,408,739 | 10/1983 | Buchsel | 414/495 X |
| 4,690,609 | 9/1987 | Brown . | |

FOREIGN PATENT DOCUMENTS

| | | | |
|---|---|---|---|
| 3320954 | 12/1984 | Fed. Rep. of Germany | 414/540 |
| 62-120231 | 6/1987 | Japan | 280/91 |
| 98684 | 7/1961 | Norway | 414/544 |
| 438973 | 12/1967 | Switzerland | 280/91 |
| 675307 | 7/1952 | United Kingdom | 280/43.24 |
| 820782 | 9/1959 | United Kingdom | 414/544 |

*Primary Examiner*—Robert J. Spar
*Assistant Examiner*—Robert S. Katz
*Attorney, Agent, or Firm*—Gottlieb, Rackman & Reisman

[57] ABSTRACT

A side-loading all-terrain fork lift vehicle for handling heavy loads which are long relative to their width, e.g., junked cars, and are stored in multi-level racks separated by narrow aisles and having restricted vertical clearance between levels. The vehicle body, which is about 28 feet long, has a longitudinal, low-slung, load-carrying frame section in front of an operator's cab and at its front and rear ends is mounted by hydraulic piston and cylinder units on front and rear ground wheels which can be independently driven and steered in forward or reverse through a full 180° arc for straight ahead and sideways movements, for radius turning movement, and for crabwise movement. The mast is mounted on a trolley guided for reciprocal movement along a pair of transverse beams in the mid-region of the frame section which can be lowered by the hydraulic units so as to rest on the ground during on-loading and off-loading for maximum stability of the vehicle. Interlocks prevent vehicle movement when the frame section is down or the mast is up. The mast can be tilted slightly forward to facilitate on-loading and off-loading and slightly back for safety during load transfer when the mast is up, and can also be shifted slightly to either side if the fork arms are not properly aligned with the rack.

9 Claims, 7 Drawing Sheets

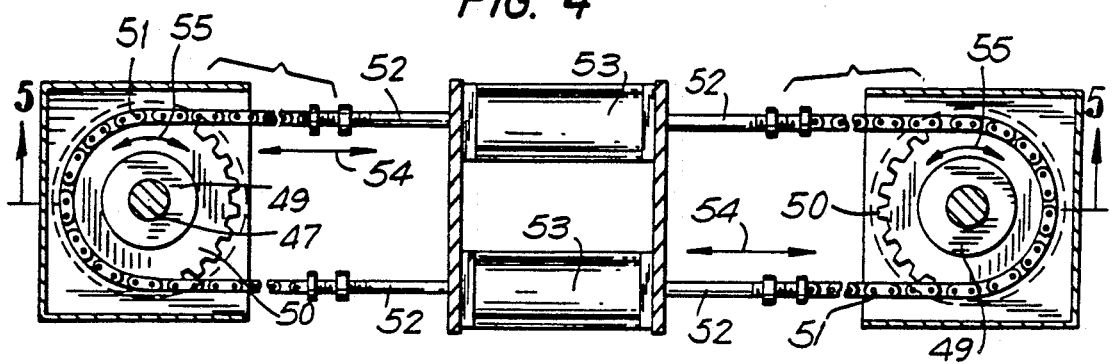
FIG. 4
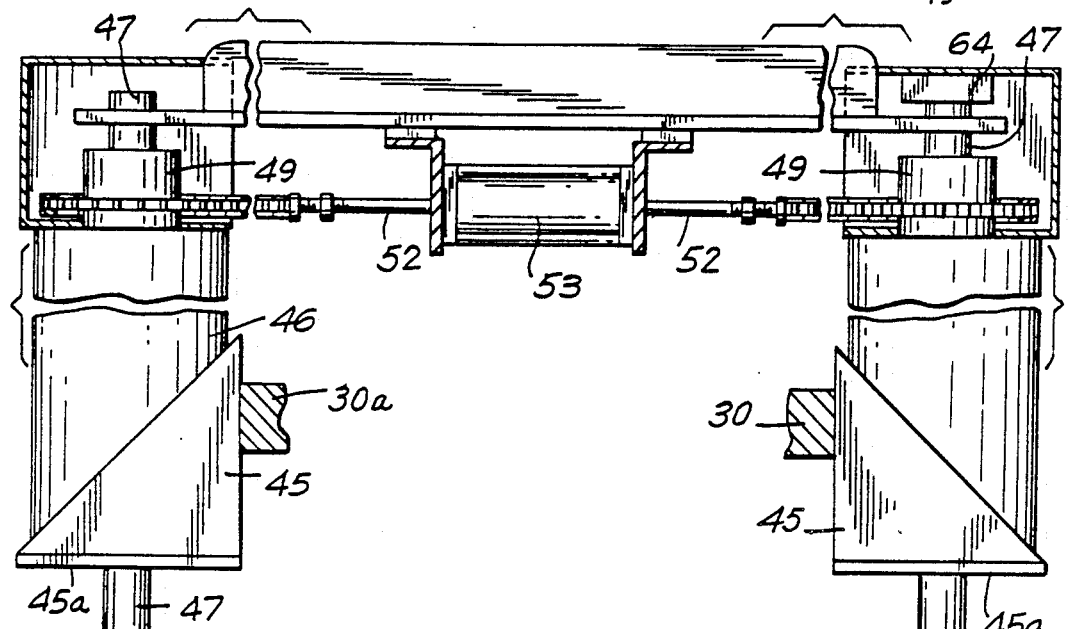
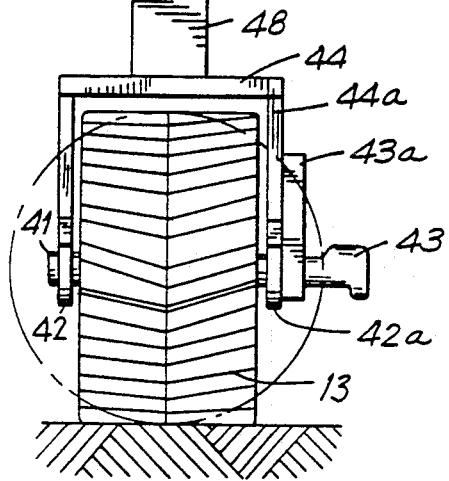
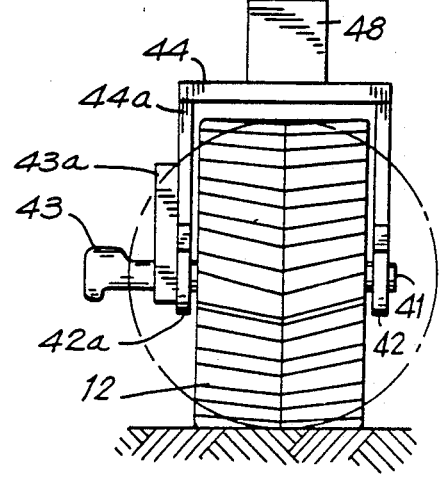
FIG. 5

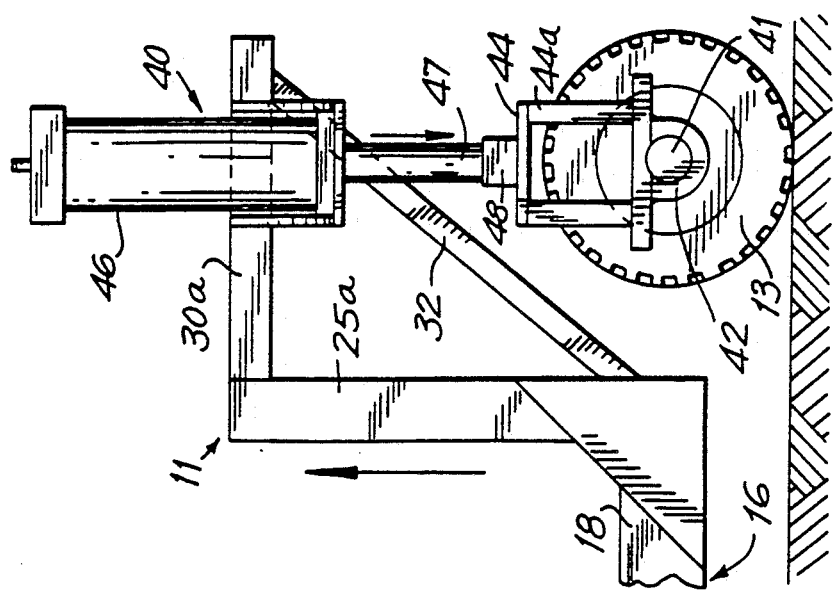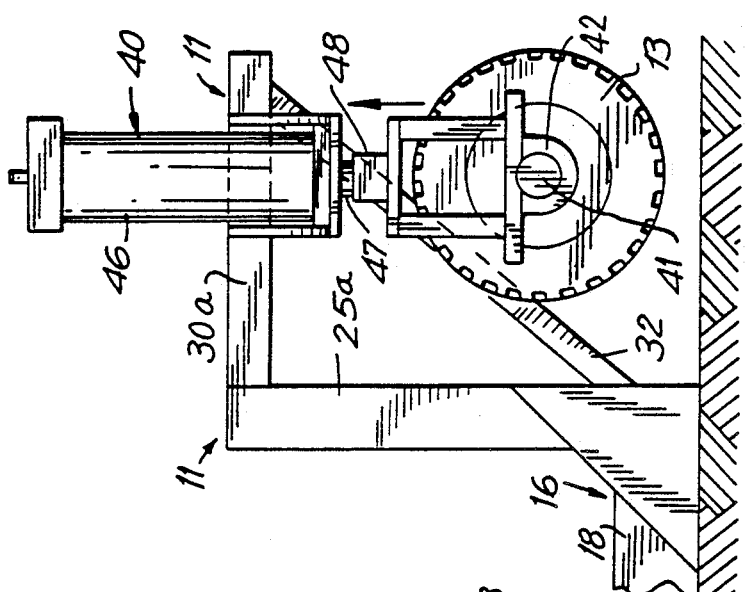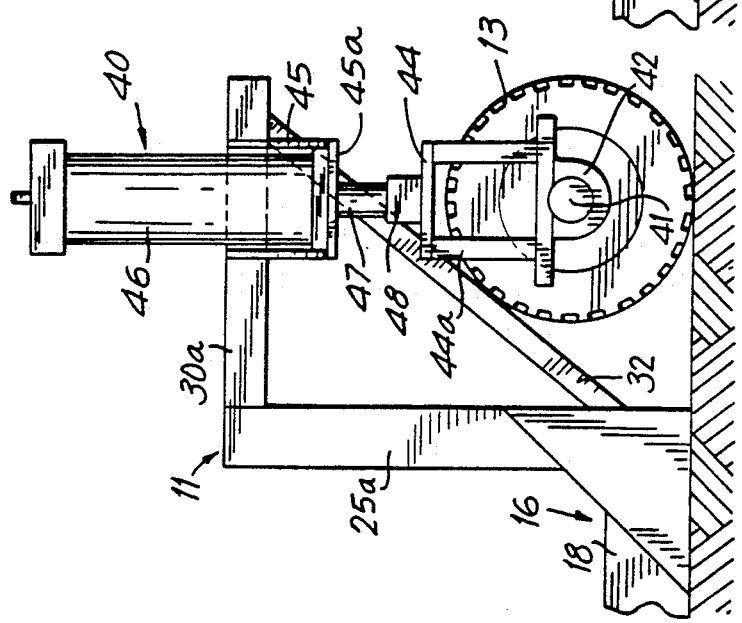

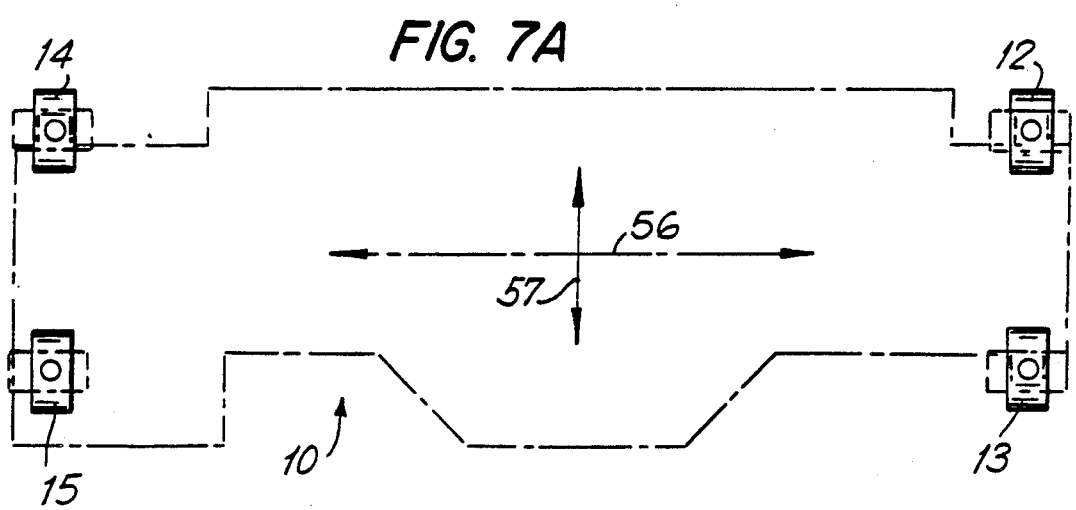
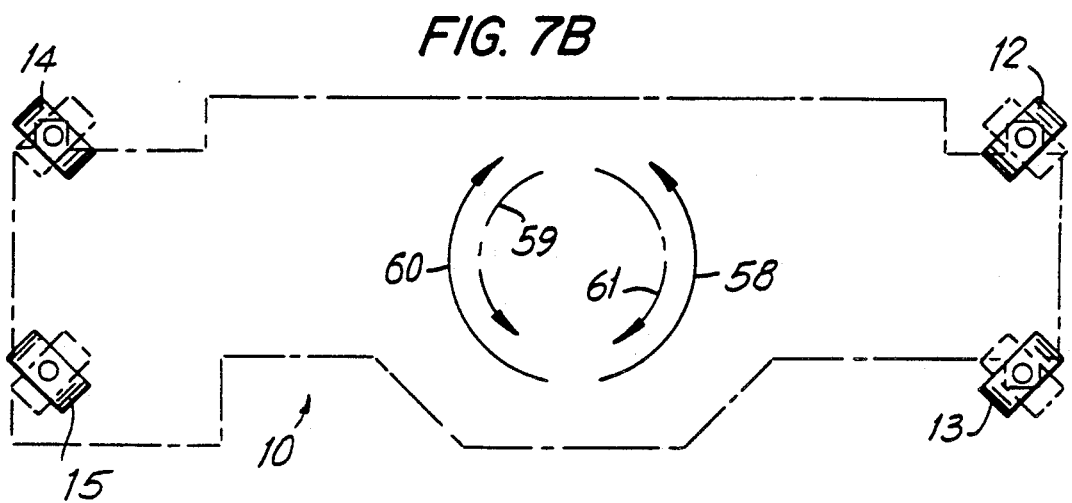
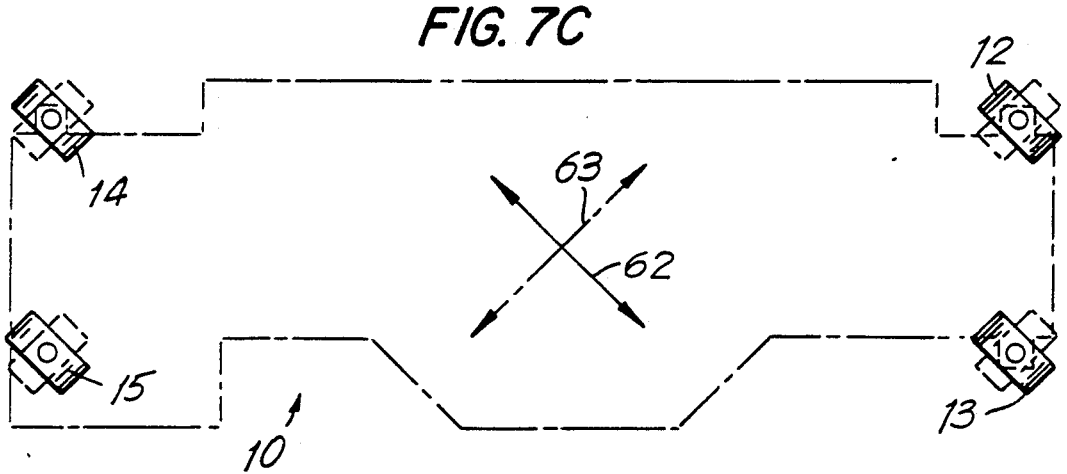

SIDE-LOADING FORK LIFT VEHICLE

This invention relates to fork lift vehicles, and in particular to a side-loading fork lift vehicle for handling heavy loads which are long relative to their widths.

Although the present invention is believed to be of wide ranging utility, it will be described herein in the first instance as applied to the handling of junked cars.

BACKGROUND OF THE INVENTION

Side-loading fork lift vehicles (sometimes also referred to as "fork lift trucks") have been well known for many years. See, for example, Hegarty U.S. Pat. No. 2,591,544; Lull U.S. Pat. No. 2,621,811; Erickson et al. U.S. Pat. No. 3,031,091; Quayle U.S. Pat. No. 3,167,201; Jinks et al. U.S. Pat. No. 3,168,956, and numerous others. Such vehicles lend themselves readily to handling loads which are stored or to be stored in multi-level stacks or racks separated by narrow aisles and having relatively restricted vertical clearance between levels, and by virtue of their structural and operating characteristics enable more of the available ground space of the storage facility to be profitably occupied by the stored loads and less of the ground space to be wasted in unoccupied wide aisles between the stacks or racks.

Such an optimization of storage space vs. aisle space utilization is especially important in an automotive junk yard because of the fact that junked or wrecked cars, which have to be stored in multilevel racks, are exceedingly bulky and are long relative to their width. Until now, however, the operation of such automotive junk yards has been a rather uneconomical undertaking because of the need to leave large aisles between adjacent racks to accommodate the relatively great maneuvering room required by the heretofore conventionally used front-loading fork lift trucks for removing cars from or placing them into the racks. Thus, the number of cars that can be stored in any given facility is likewise limited, which, with land values and labor costs continuously on the rise, puts a severe strain on the profitability of the storage facility.

The known side-loading fork lift trucks, as far as the present inventors are aware, have not been used in the storage of junked or wrecked cars and have not been suited for such use, even when designed for lifting relatively long loads such as pipes and timbers. In particular, such side-loading fork lift trucks have a very limited capability in terms of the height to which they can elevate a junked or wrecked car, usually about 12 feet off the ground. Moreover, as the above-cited representative patents make clear, in the known side-loading fork lift trucks the problems being dealt with have generally been one or another of the individual problems of counterbalancing the load, vehicle stability, load distribution between the wheels of the vehicle, or the like. Also, the known side-loading fork lift vehicles have generally been relatively short, and thus maneuverability problems have not arisen in connection therewith or been insuperable. However, it appears that none of the prior art patents has ever dealt with the totality of the vehicle operation.

BRIEF DESCRIPTION OF THE INVENTION

It is an object of the present invention, therefore, to provide a side-loading fork lift vehicle which is suited for handling relatively long and narrow bulky loads such as junked or wrecked cars and which avoids the drawbacks and the disadvantages of the known side-loading fork lift vehicles.

It is another object of the present invention to provide a novel and improved side-loading fork lift vehicle which is considerably longer than known fork lift vehicles of this class but is nevertheless highly maneuverable both in forward and reverse even in narrow aisles and on erose terrain, which is extremely stable during on-loading and off-loading as well as when in motion, which can shift a load such as a junked or wrecked car from a limited clearance storage rack space at ground level directly into the vehicle and onto the load-carrying frame thereof, and vice versa, without having to raise the fork arms off ground level, and which is capable of manipulating such loads to and at heights of as much as 30–35 feet above ground level.

Generally speaking, the basic objectives of the present invention are attained by means of a side loading fork lift vehicle which is characterized by the following features:

a. The vehicle has a vehicle body which has front and rear ends and opposite sides, front and rear ground wheels with independent axles, and respective vertical hydraulic piston and cylinder units interposed between the axles and the front and rear ends of the vehicle body for mounting the latter on the wheels.

b. Respective motor means are provided for the front and rear ground wheels to drive the same both in forward and reverse, along with means for controlling the orientations of the front and rear ground wheels through respective 180 arcs 90° to either side of a line parallel to the longitudinal axis of the vehicle) to enable movement of the vehicle in either a straight ahead mode or a lateral translation mode or a radius turning mode or a crabwise mode in either the forward or the reverse direction.

c. The vehicle body includes (i) an elevated operator's cab at the rear end and (ii) an elongated, substantially rectangular load-carrying frame section arranged between the operator's cab and the front end of the vehicle body. The frame section includes respective longitudinal beam means at the opposite sides of the vehicle body and a pair of spaced, parallel transverse beam means in the midregion of the frame section and extending from one of the longitudinal beam means at one side of the vehicle body past the other of the longitudinal beam means. The longitudinal and transverse beam means are disposed in a plane below that of the operator's cab and below that of the front end of the vehicle body, and the hydraulic piston and cylinder units are operable to maintain the beam means elevated above the ground when the vehicle is to be in motion and to lower the beam means to rest on the ground when the vehicle is to be stationary during an on-loading or off-loading operation.

d. Guideway means are provided on the transverse beam means and extend along the latter, a trolley is mounted on the guideway means between the transverse beam means for reciprocal movement therealong, and first hydraulic piston and cylinder means are mounted on the frame section for moving the trolley along the guideway means.

e. Load-handling means are arranged on the trolley and include a vertical framework carried by the trolley, and mast means are mounted in the framework for vertical up and down movement relative thereto. Second hydraulic piston and cylinder means are mounted on the trolley for moving the mast means up and down, and a plurality of fork arms are carried by the mast means and extend therefrom in a direction away from the mentioned one side of the vehicle body so as to be able, by an appropriate movement of the trolley, to be either retracted to a position within the confines of the frame section or protracted to a position outside the confines of the frame section beyond the mentioned second side of the latter at any elevation of the mast means, even at ground level.

BRIEF DESCRIPTION OF THE DRAWINGS

The foregoing and other objects, characteristics and advantages of the present invention will be more clearly understood from the following detailed description of a preferred embodiment thereof when read in conjunction with the accompanying drawings, in which:

FIG. 2A is a fragmentary sectional view taken along the line 2A—2A in FIG. 1 and illustrates the guide track means for the trolley;

FIG. 2B is a fragmentary sectional view taken along the line 2B—2B in FIG. 2A;

FIG. 4 is a sectional view taken along the line 4—4 in FIG. 1 and illustrates the mechanism for disposing the ground wheels of the vehicle in a variety of orientations through a 180° arc;

FIG. 5 is a sectional view taken along the line 5—5 in FIG. 4;

FIGS. 6A, 6B and 6C are enlarged fragmentary side elevational views illustrating the mounting of the front end of the vehicle body on the front ground wheels (the arrangement is essentially the same for the rear wheels) and show the relative positions of the wheels and their associated piston and cylinder units in different stages of operation;

FIGS. 7A, 7B and 7C are diagrammatic representations of the various types of maneuvering movements which the side-loading fork lift vehicle according to the present invention can execute depending on the relative orientations of the front and rear ground wheels.

DETAILED DESCRIPTION OF THE INVENTION

Figure 1:
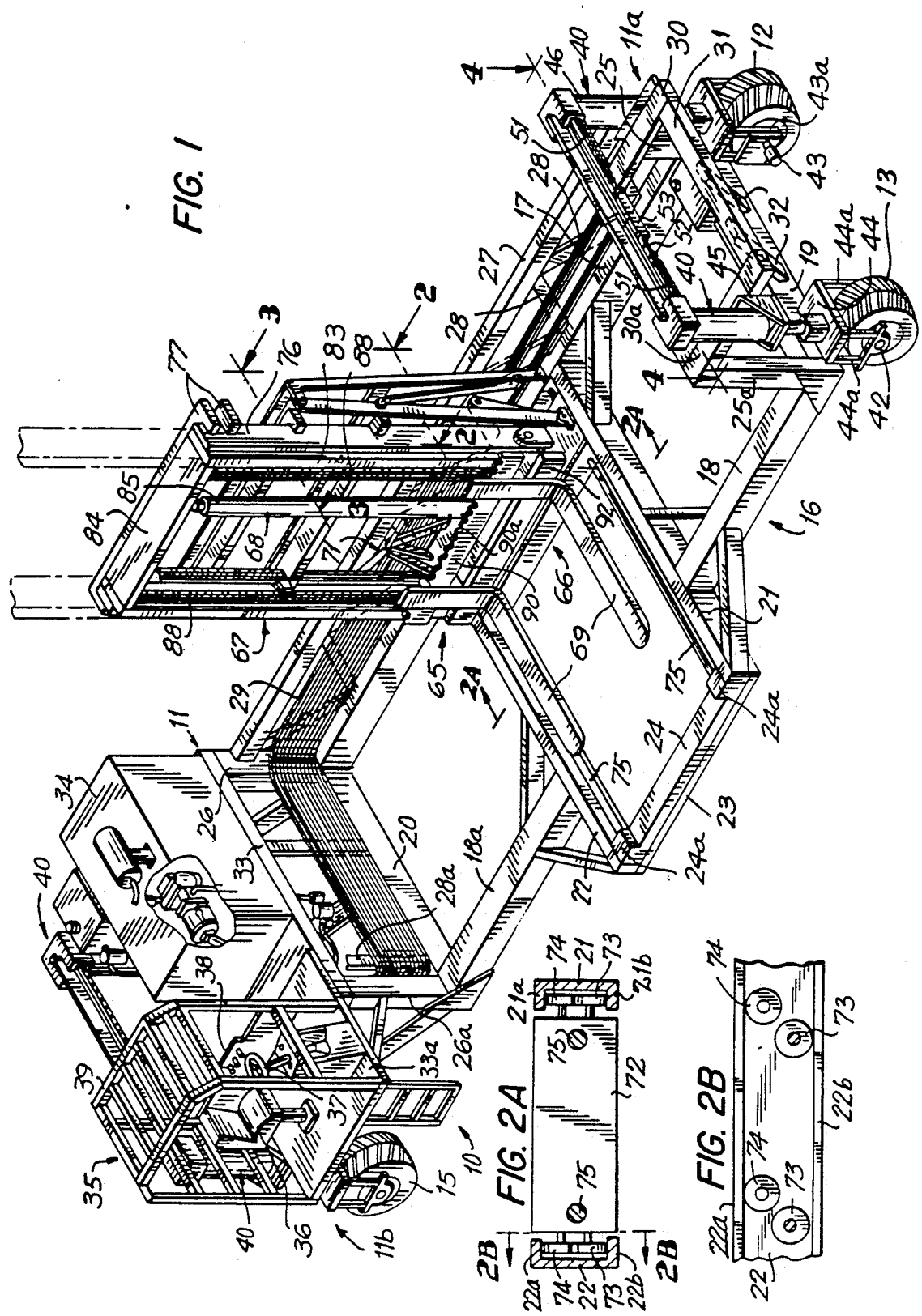
FIG. 1 is a perspective view of the side loading fork lift vehicle according to the basic embodiment of the present invention.

Referring now to the drawings in greater detail, the side-loading fork lift vehicle 10 according to the present invention (FIG. 1) has an elongated vehicle body 11 the length of which in the illustrated embodiment is approximately 28 feet. The vehicle body is mounted, as will be more fully explained hereinafter, on two sets of ground wheels 12, 13 and 14, 15 at its front end 11a and rear end 11b. The wheels 12-15 are equipped with conventional semi-solid industrial tires, i.e., tires which are both internally air pressurized and filled with a resilient foam, such as are commonly used in fork lift trucks.

Intermediate its front and rear ends, the vehicle body includes a rigid, rectangular, planar, main frame section 16 which in the illustrated embodiment is about 18.5 feet long. The frame section includes respective longitudinal beam means consisting of a full-length beam 17 at one side of the vehicle body and a divided beam 18-18a at the opposite side of vehicle body, respective cross beams 19 and 20 interconnecting the longitudinal beams at the front and rear ends of the frame section, and a pair of spaced, parallel transverse beams 21 and 22 in the midregion of the frame section. The transverse beams 21 and 22 are rigidly connected at one end of each to the beam 17 at one side of the vehicle body, are rigidly connected intermediate their ends to the proximate intersecting ends of the sections of the divided beam 18-18a at the other side of the vehicle body, and extend outwardly of the latter beyond the beam 18-18a, being rigidly interconnected with each other at their outer ends by means of a crossbar 23. Located on the crossbar 23 between the outer ends of the transverse beams 21 and 22 is a U-shaped member 24, which is removably secured in place by means of bolts (not shown), for a purpose to be more fully explained presently. The beams 17, 18-18a, 19 and 20 are hollow steel box beams approximately 8 inches high by 6 inches wide with a wall thickness of about 0.5 inch. The beams 21 and 22 are channel beams, as more fully described hereinafter.

Rigidly affixed to the front and rear ends of the frame section 16 are vertical upright posts 25, 25a and 26, 26a which also are box beams of the same type as the beams 17-20. The posts 25 and 26 are rigidly connected to each other by a reinforcing structure consisting of a horizontal longitudinal brace beam 27 and a plurality of angled struts 28 which are rigidly connected to and disposed in a zig-zag arrangement between the parallel beams 17 and 27. The struts 28 and a number of additional struts 28a connected with the cross beam 20 also serve to support the multiplicity of hydraulic lines 29 for the various operating components of the vehicle. Extending frontwardly from the upper ends of the posts 25 and 25a are horizontal frame members 30 and 30a which are rigidly interconnected at their front ends by a cross beam 31, with the latter being additionally rigidly connected to the front cross beam 19 of the main frame section 16 by a pair of downwardly and rearwardly angled struts 32. A similar arrangement of beams and struts, not fully illustrated in FIG. 1 and not necessary to describe in detail, is provided at the rear posts 26 and 26a and serves to support a platform 33 on which a housing 34 for the vehicle controls is supported, and an additional platform 33a on which the operator's cab 35 is disposed. In the illustrated embodiment of the invention, the operator's cab includes a seat 36, a steering wheel 37, and a set of control levers 38, and, for the protection of the operator, an overhead cage 39. The right-hand side edge of the platform 33a is disposed substantially in line with the vertical plane of the outer edge of the sub-frame section constituted by the transverse beams 21 and 22, to enable the operator to have a direct sight line to, and a clear view of the location of, the right-hand edge of the transverse sub-frame section, thereby providing the operator with a clear view of the on-loading and off-loading operations. Thus, this disposition of the operator's cab gives the operator excellent control over the movements of the vehicle and makes it safe to operate the vehicle in aisles which are as narrow as possible, i.e., only about a foot wider than the width of the vehicle at the fork lift section thereof.

The vehicle body 11 is mounted at its four corners on the wheels 12-15, each of which has its own axle, through the intermediary of four identical double-acting hydraulic piston and cylinder units 40, and since the four mounting arrangements are also identical, it will be sufficient to describe only one of them.

Focusing primarily, therefore, on the unit 40 associated with the wheel 13 at the right front corner of the vehicle, it can be seen from FIGS. 1, 4, 5 and 6A-6C that the opposite outboard and inboard ends of the axle 41 of the wheel 13 are rotatably received in respective bearings or journals 42 and 42a, with the axle extending beyond the inboard journal to enable a respective hydraulic motor 43 to be drivingly coupled to the axle. A platform 44 is connected to and supported by the journals 42 and 42a through respective pairs of vertical legs 44a, with the inboard pair of legs also serving as a support for a mounting plate 43a of the motor 43. Rigidly affixed to the horizontal beam 30a at the outboard side edge thereof is a bracket 45, on the horizontal base 45a of which is fixedly mounted the lower end of a cylinder 46 which constitutes a part of the associated piston and cylinder unit 40. One part of the piston rod 47 of the unit 40 extends downwardly out of the cylinder 46 and both axially and rotatably slidably through an opening in the bracket 45, and at its lower extremity is rigidly affixed to the platform 44 with the aid of a bushing 48. The other part of the piston rod 47 extends upwardly out of the cylinder 46 (see FIGS. 4 and 5) through an axial bushing or sleeve 49 rotatably journaled in the head of the cylinder and to which the rod is nonrotatably keyed or otherwise secured.

It will be apparent, therefore, that by a selective admission and/or release of pressure in the opposite ends of the four cylinders 46, the vehicle body 11 can be lowered relative to the wheels so as to bring the frame section 16 to rest on the ground, as shown in FIG. 6A (which represents the stationary on loading/off-loading state of the vehicle), or the vehicle body can be raised relative to the wheels so as to lift the frame section off the ground, as shown in FIG. 6C (which represents the in motion state of the vehicle), or one or more of the wheels can be individually raised off the ground relative to the vehicle body, as shown in FIG. 6B (which represents a possible state of the vehicle during a tire-changing or repair operation). It should be understood, in this regard, that the possible extent to which the vehicle body can be raised as shown in FIG. 6C and hence the extent to which the frame section 16 can be elevated off the ground depends on the lengths of the cylinders 46 and the stroke of the pistons therein. This arrangement, therefore, enables the vehicle body 11 to be elevated considerably more than heretofore known side-loading fork lift trucks, and as a consequence thereof the vehicle 10 according to the present invention is capable of being used on all types of terrain, even rocky or ridged as well as erose or rutted surfaces, in contrast to the known vehicles which are essentially intended for use only on flat, relatively smooth surfaces.

Referring now to FIGS. 4 and 5, it will be seen that affixed to each of the rotary sleeves or bushings 49 above the associated cylinder 46 is a respective sprocket wheel 50. The two paired sprocket wheels at each end of the vehicle are in mesh with a pair of sprocket chains 51 trained thereabout, the opposite ends of each of which are connected with the proximate ends of two piston rods 52 each projecting from one end of a respective one of two double-acting hydraulic cylinders 53. Thus, by means of an appropriate control of the admission of pressure into and release of pressure from the paired cylinders 53, the same can be operated in synchronism with each other to shift the sprocket chains 51 in one direction or the other, as indicated by the arrows 54 in FIG. 4, so as to rotate the sleeves 49 and thereby the piston rods 47 about their respective axes, as indicated by the arrows 55 in FIG. 4. This in turn enables the associated paired wheels 12 and 13 or 14 and 15 to be displaced angularly about an axis perpendicular to the ground through an arc of at most 180°, i.e., 90° to either side of the straight ahead orientation, as indicated in phantom outline in FIG. 5.

The various possible movements which the vehicle 10 according to the present invention can execute as a consequence of the above-described steering feature are represented in FIGS. 7A-7C. With the four wheels all oriented either in the direction of or perpendicularly to the longitudinal axis of the vehicle, as shown in solid and broken lines in FIG. 7A, the vehicle can be driven, in either forward or reverse, either in the straight ahead mode indicated by the arrows 56 or in the straight sideways translation mode indicated by the arrows 57. With the front wheels 12 and 13 turned in one direction (left or right) relative to the longitudinal axis of the vehicle and the rear wheels 14 and 15 turned in the opposite direction (right or left, respectively), as shown in solid and broken lines in FIG. 7B, the vehicle can be driven, in either forward or reverse, in a radius turning mode either to the left as indicated by the arrows 58 and 59 or to the right as indicated by the arrows 60 and 61. With the four wheels all angled in the same direction (right or left) relative to the longitudinal axis of the vehicle, as shown in solid and broken lines in FIG. 7C, the vehicle can be driven, in either forward or reverse, in a crabwise mode or angled translation as indicated by the arrows 62 and 63.

It should be mentioned, in this regard, that in driving the vehicle 10 in any mode and any direction, only the front wheels are directly steered by the operator. Their position assumed under the control of the front piston and cylinder means 52/53 is sensed by a potentiometer 64 (FIG. 5) which in turn sends a signal to a suitable bridge circuit or the like (not shown) that will tend to unbalance the bridge and cause a slave potentiometer (not shown) to re-establish the balance condition by sending a signal to an electronically controlled hydraulic valving system (not shown) which in turn pressurizes the rear piston and cylinder means 52/53 so as to shift the rear wheels rapidly and continuously into the proper alignment relative to the front wheels corresponding to the particular movement mode selected by the operator.

Reverting now to the frame section 16 of the vehicle body 11, the transverse beams 21 and 22 thereof comprise the basic means for supporting and guiding the load-transferring mechanism 65 of the vehicle 10 according to the present invention, which includes a trolley or carriage 66 arranged for reciprocating movement along the beams 21 and 22, a vertically extendible mast 67 carried by the trolley together with piston and cylinder means 68 for elevating and lowering the mast, a pair of load-engaging fork arms 69 supported by the mast for movement therewith, means 70 for moving the trolley reciprocally along the beams 21 and 22, and means 71 for tilting the mast to a limited degree forwardly and rearwardly relative to the vertical. As a safety measure, suitable interlock means are provided for inhibiting movement of the vehicle when the piston and cylinder units 40 are activated to lower the frame section 16 to the ground or when the piston and cylinder means 68 are activated to elevate the mast 67.

Figure 2:
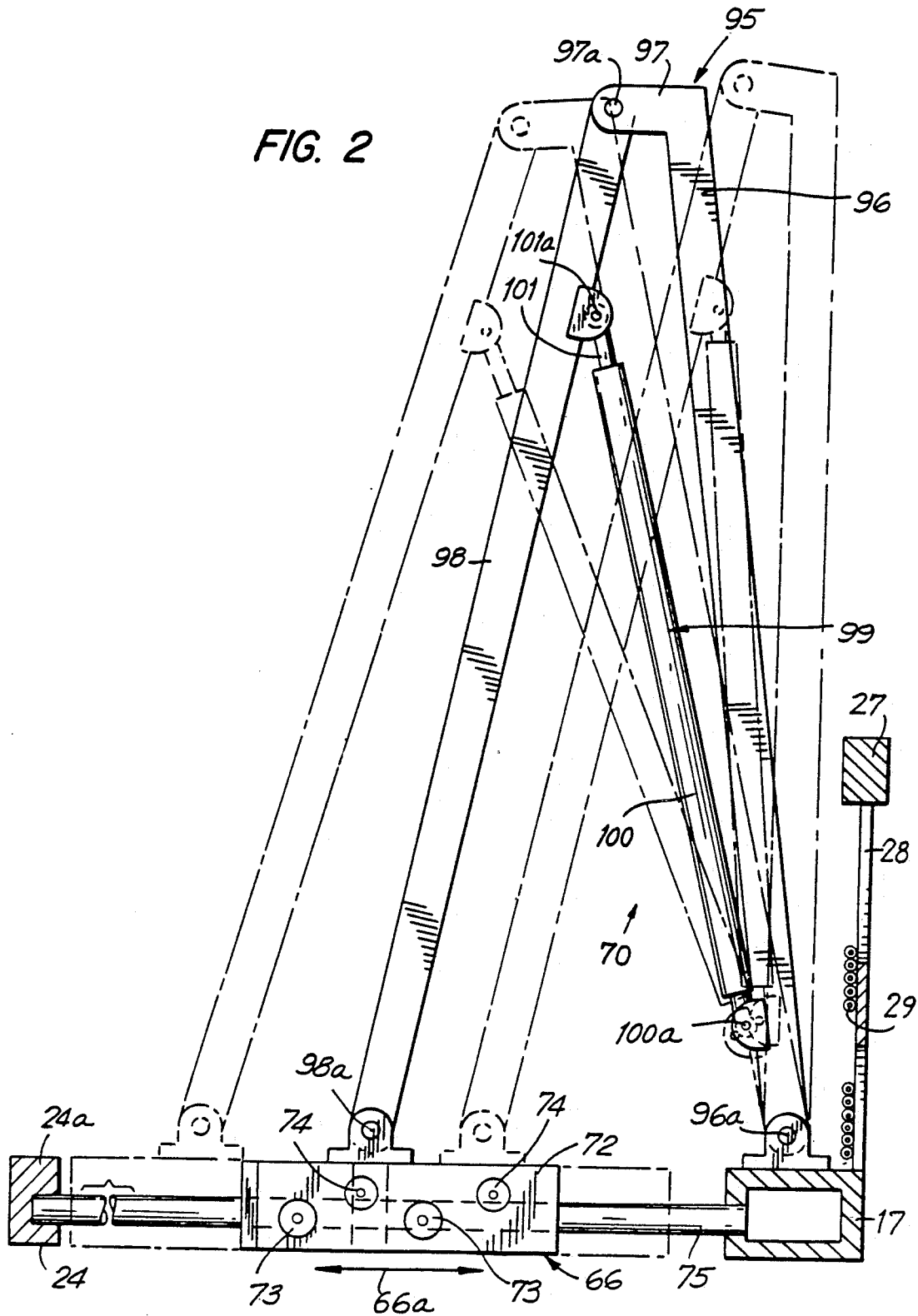
FIG. 2 is an elevational view, taken along the line 2—2 in FIG. 1, of the mechanism for moving the mast-carrying trolley back and forth along the transverse beams of the vehicle body frame section.
Figure 3:
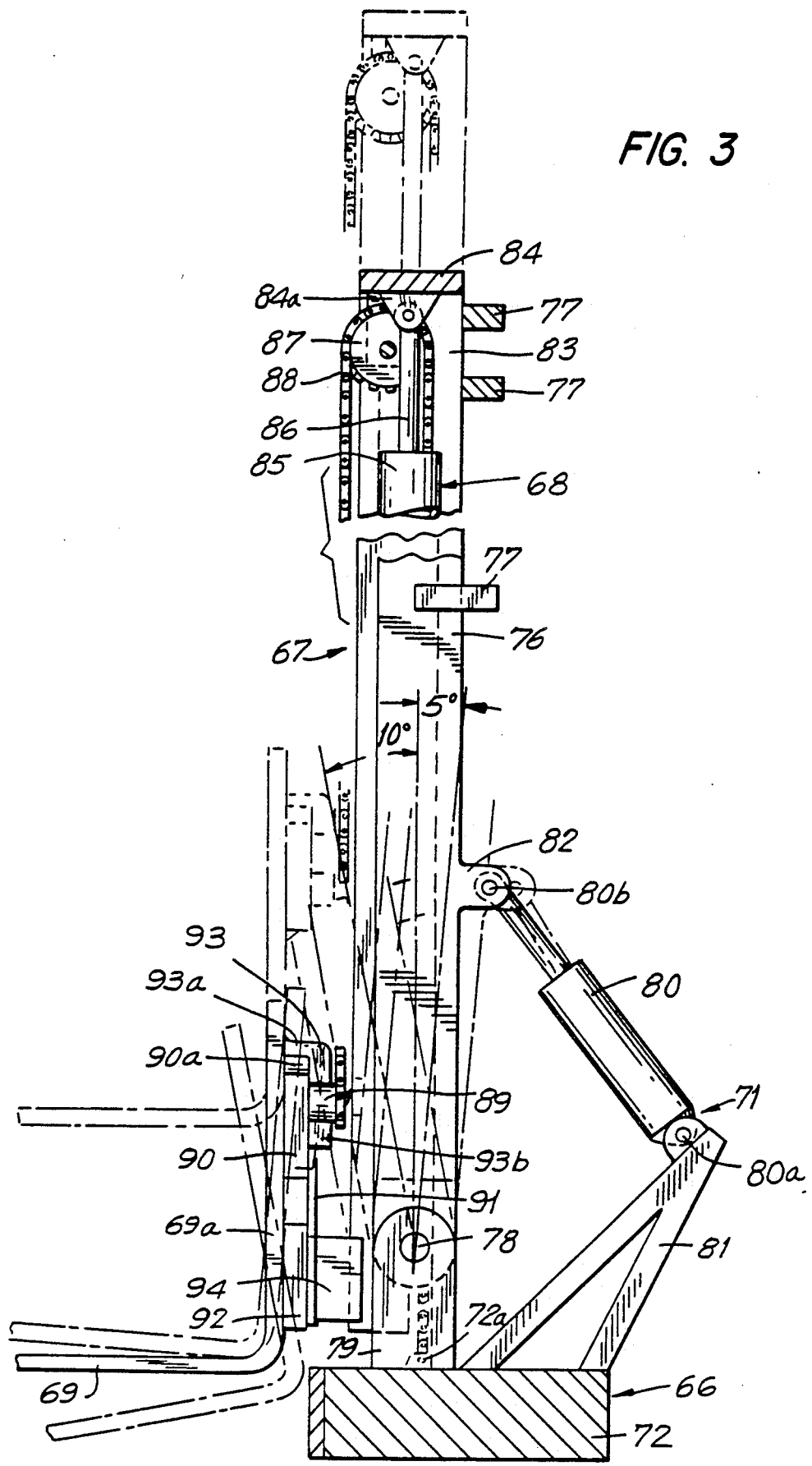
FIG. 3 is an elevational view, taken along the line 3—3 in FIG. 1, illustrating the mast schematically and also showing the mechanism for tilting the same forwardly and rearwardly relative to the vertical.

More particularly, the trolley 66, which for the sake of simplicity is illustrated in FIGS. 1, 2 and 3 as having the form of a rectangular frame 72 composed of flat bars but which preferably is a hollow grid-like frame structure composed of welded I-beams or the like, is supported directly by the transverse beams 21 and 22. To this end, these beams, as best shown in FIGS. 2A and 2B, are open-ended and sideways open channel-shaped structures (the channels are not shown in FIG. 1), the upper and lower webs or flanges 21a/21b and 22a/22b of which define a pair of guideways or tracks. On each of its opposite side walls the trolley is provided with a respective set of two pairs of rollers or wheels 73 and 74. The rollers 73 and 74 in each set are staggered with respect to each other, with the axes of the rollers 73 being disposed somewhat lower than those of the rollers 74. The arrangement thus is such that on each side the lower rollers 73 run along the upper surfaces of the respective lower beam flanges 21b and 22b while the upper rollers 74 run along the lower surfaces of the respective upper beam flanges 21a and 22a. The purpose and advantages of this arrangement are that the upper rollers 74 prevent the trolley and therewith the mast from being canted forwardly when a load is supported on the fork arms. Movement of the trolley in a true straight line along the beams 21 and 22 and without the possibility of lateral shifting is ensured by means of a pair of guide rods 75 which are supported at one end by the longitudinal beam 17 and at the other end by the upstanding side portions 24a of the U-shaped member 24 and which extend through appropriate passageways in the trolley.

The mast 67 (FIGS. 1 and 3) includes a primary framework consisting of a pair of substantially vertical parallel guide beams 76 which are rigidly interconnected with each other in their upper regions by a plurality of transverse tie brackets 77 and are tiltably connected at their lower regions by pivot bolts 78 to a pair of upright brackets 79 rigidly affixed to the trolley. Respective piston and cylinder units 80 are articulated at 80a and 80b between a pair of stanchions 81 carried by the trolley at each side thereof and a pair of ears or lugs 82 projecting from the respective guide beams 76. The mechanism 71 constituted by the elements 80–82 is so arranged that, taking into account the angle between the piston and cylinder units 80 and the guide beams 76 as well as the stroke of the pistons of the piston and cylinder units 80, the primary framework of the mast may be tilted forwardly about 10° off the vertical and rearwardly about 5° off the vertical.

Slidably mounted within the primary mast framework is a secondary rectangular framework consisting of a pair of substantially vertical parallel beams 83 which are rigidly interconnected with each other at their top and bottom ends by respective cross beams 84 (only the top one is shown) and are slidably arranged within the primary framework constituted by the guide beams 76. Here, again for the sake of simplicity, the beams 76 and 83–84 are illustrated as having the form of flat bars, but in the preferred embodiment of the present invention the beams 76 are channel-shaped beams of U-shaped cross-section with the channels being open to the inside of the framework, while the beams 83 are I-beams slidably guided for longitudinal movement within the channels of the beams 76. The cross beams 84 preferably are likewise I-beams, although this is not indispensable. Rigidly mounted on the trolley 66 or an adjunct thereof (e.g., a suitable pedestal welded to and supported by a pair of interior cross beams of the grid-shaped I-beam frame mentioned above) is a vertical cylinder 85 of the hydraulic piston and cylinder means 68, the piston rod 86 of which extends upwardly out of the cylinder and is connected at its free end to the center of the upper cross beam 84 of the secondary mast framework at 84a. Rigidly affixed to the underside of the upper cross beam 84 at opposite sides of the piston rod connection are a downwardly depending pair of parallel-plate bearing brackets (not shown) in which are journaled respective sprocket wheels or pulleys 87 about which are trained respective sprocket chains 88. Each of the chains 88 is anchored at one end to the trolley 66 at 72a.

At their other ends, the chains 88 are anchored, respectively, to a pair of bosses 89 (only one is shown in FIG. 3) rigidly affixed to the rear face of an upper bar 90 which is rigidly interconnected by suitable braces 91 to a lower bar 92. The upper bar 90 is provided in its upper edge with a plurality of notches 90a each of which is adapted to receive the horizontal leg 93a of a respective downwardly angled L-shaped rigid hook member 93 welded to the back face of the vertical member 69a of a fork arm 69. The vertical leg 93b of the hook member 93 is spaced from the back face of the bar 90 just enough to enable the latter to fit snugly and tightly into the space between the vertical hook leg 93b and the back face of the vertical member 69a of the fork arm 69. The bar 90 thus constitutes the means by which the fork arms are supported and carried by the secondary mast frame 83–84 for vertical movement therewith. The function of the lower bar 92 is solely to stabilize the upper bar during its ascent and descent, for which purpose the bar 92 has rigidly affixed to its back face a suitable pair of brackets 94 (only one is shown in FIG. 3) which engage the respective beams 83 at their inside faces to inhibit any lateral shifting of the fork arm support bar 90. In this regard it should be mentioned that, although the brackets 94 have been illustrated as flat plates, in their preferred form, i.e., when used in conjunction with a secondary mast frame including vertical I-beams 83, the brackets 94 will be generally L-shaped angle members having their long parallel webs extending from the bar 92 past the inside edges of the beam flanges and having their coplanar webs extending away from each other behind the respective beam flanges, thereby additionally to provide a restraint against any outward displacement of the bar 90 and the fork arms 69 away from the mast frame (however unlikely that may be).

It will be understood, therefore, that when the piston and cylinder means 68 are extended, the secondary mast frame 83–84 is elevated out its lower-most rest position shown in solid lines in FIG. 1 into a position such as is shown in phantom outline in FIG. 3, as a consequence of which the fork arms 69 are likewise elevated out of their lowermost rest position. It will further be understood, of course, that by virtue of the presence of the pulley and chain combinations 87–88, during any up or down movement of the mast frame 83–84, the fork arms actually will travel a distance approximately double that of the stroke of the piston of piston and cylinder means 68. Thus, the fork arms will reach their maximum elevation adjacent the top end of the mast frame 83-84 at the same time that the latter reaches the limit of its upward movement, and vice versa.

Referring now to FIG. 2, the reciprocal movements of the trolley 66 and the mast 67 outwardly and inwardly of the frame section 16 in the directions of the arrows 66a can, of course, be effected by means of hydraulic piston and cylinder combinations connected directly between the trolley and the longitudinal beam 17 or an adjunct of the latter. In that case, however, the movements are relatively slow and the cylinders must be long enough to permit a piston stroke as long as the extent of travel of the trolley. Accordingly, in order to enable the trolley movement to be speeded up and to enable the cylinder length to be materially reduced, the mechanism 70 according to the present invention for moving the trolley comprises a linkage system including, for each side of the trolley, a crank arm link or lever 95 the free end of the longer arm 96 of which is articulated at 96a to the beam 17 and the free end of the shorter arm 97 of Which is articulated at 97a to one end of a straight arm link or lever 98 the other end of which is articulated at 98a to the trolley frame 72. The mechanism 70 further comprises respective piston and cylinder means 99 each of which includes a double-acting hydraulic cylinder 100 having one end articulated at 100a to the link arm 96 intermediate the opposite ends thereof, and a piston rod 101 projecting from the other end of the cylinder and having its free end articulated at 101a to the link arm 98 intermediate the opposite ends of the latter. The mechanical advantage afforded by the linkage system 95 and the piston and cylinder means 99 connected therewith, as well as the manner in which they enable the abovementioned objectives of increasing the speed of movement of the trolley and reducing the length of the cylinder to be achieved, will be readily understood by those skilled in the art and hence need not be further described herein.

Figure 8:
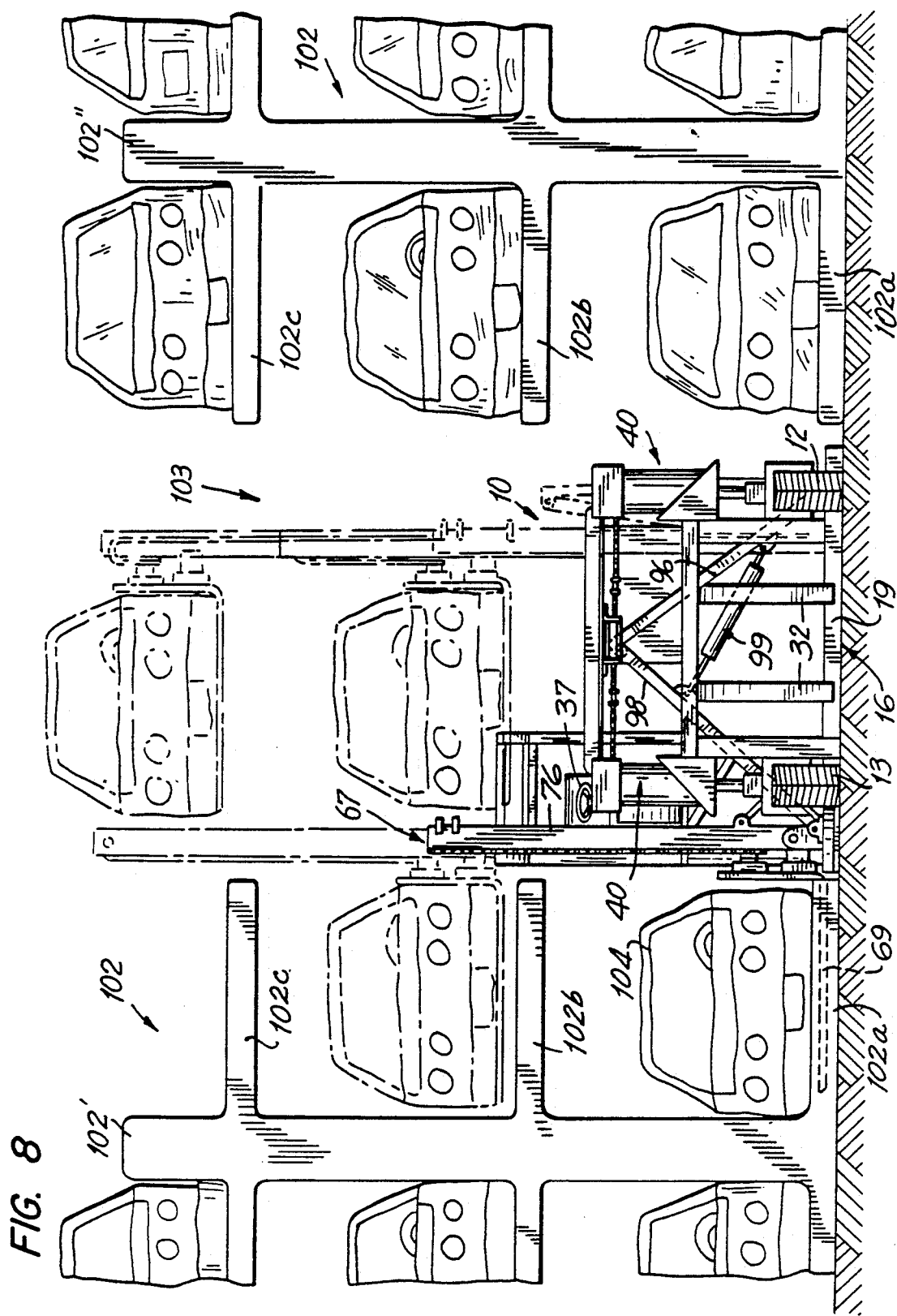
FIG. 8 is a front elevational view of the fork lift vehicle according to the present invention in an aisle between two car body-supporting racks and illustrates the different stages of a transfer of such a car body from one level of the rack to another.

The advantages of the side-loading fork lift vehicle 10 according to the present invention, including those already adverted to hereinbefore as well as others, may best be summarized with reference to FIG. 8 which illustrates a junked or wrecked car storage facility equipped with a large number of multilevel storage racks 102 having limited vertical clearance between successive levels 102a, 102b and 102c and having the next adjacent racks 102' and 102" separated from each other by a relatively narrow aisle 103 about 10 feet wide. It will be readily apparent from the foregoing description that in the absence of the radius turn mode front and rear wheel steering system of the present invention, the vehicle 10, which is about 26-28 feet long and about 9 feet wide at its fork lift section and in the region of its operator's cab, and which provides a load-carrying frame section about 18-20 feet long and about 6 feet wide so as to be capable of accepting a car body into its confines, would ordinarily not be maneuverable into the aisle 103 from a perpendicularly running aisle. The steering capabilities of the vehicle 10 thus constitute a major advantage of the present invention, especially when considered in light of the fact that the same steering capabilities, with the center of gravity of the vehicle being located between the wheels when the trolley is retracted, also enable the vehicle body to have a relatively narrow 6-foot wide wheel base, which is far less than that of known side-loading fork lift trucks designed for handling heavy loads which are long relative to their width. Moreover, once in the aisle 103 the vehicle can be easily maneuvered closer to the rack 102', from one of the levels of which a car is to be removed, by utilizing either the crab mode steering or the lateral translation mode steering or both as needed. This capability is, of course, further enhanced by the location of the operator's cab, which permits him to gauge the location of the outer edge of the transverse beam structure relative to the desired rack section with great accuracy.

Assuming that the car 104 in the lowest level 102a of the rack 102' is to be removed, the vehicle 10 is brought to a halt at the appropriate location, and the operator then first activates the piston and cylinder units 40 to lower the frame section 16 down onto the ground, and then the piston and cylinder means 99 (FIG. 2) to move the trolley 66 outwardly of the vehicle body along the transverse guide rail beams 21 and 22 so as to protract the fork arms 69 through the space between the upright portions 24a (FIG. 1) holding the outer ends of the guide rods 75 and under the car body 104. To facilitate entry of the fork arms under the car body, the mast 67 is tilted forwardly a bit relative to the vertical by the mechanism 71 (FIG. 3), and if the forks turn out not to be fully aligned with the car body the operator can first briefly interrupt the forward movement of the trolley and operate a mechanism (not shown) to shift the mast laterally a few inches, i.e., toward the front or the rear end of the vehicle, to achieve the proper positioning of the forks.

Once the forks are under the car, the operator first activates the mechanism 71 to reverse the inclination of the mast and to tilt it a bit backward relative to the vertical. He then raises the secondary mast frame 83-84 a few inches, by extending the piston and cylinder means 68, to lift the car 104 off the rack supports 102a just enough to clear those and the frame section beams 18-18a and 21-22, and activates the mechanism 70 to retract the trolley and the forks into the confines of the vehicle body 11. When the trolley is fully retracted, and assuming the car is to be transferred to another rack, the operator reverses the previous activation of the piston and cylinder means 68 and lowers the mast so as to bring the car to rest on the beams 18-18a, 21 and 22. He then activates the piston and cylinder units 40 to raise the vehicle frame section 16 off the ground, which releases the anti-movement interlocks, and proceeds to the assigned location (first, of course, steering the vehicle away from the rack 102', for example, in the crabwise mode), where he will deposit the car 104 by first lowering the frame section 16 to the ground and then operating the mast and the trolley (in the manner already described) as needed. If alternatively, the car 104 is merely to be transferred to a higher level in the said rack column, for example into the empty rack section 102c shown in FIG. 8, the operator merely activates the piston and cylinder means 68 to raise the mast 67, and therewith the car 104 retained on the fork arms 69, to the position thereof opposite the rack section 102c, as indicated in phantom outline in FIG. 8. He then activates first the piston and cylinder means 99 to advance the trolley along its guideway means 21-22 and therewith the mast 67 to dispose the car over the rack supports, thereafter the piston and cylinder means 68 to lower the mast frame 83-84 so as to lower the car onto the rack supports, then the piston and cylinder means 99 again to fully retract the trolley and also to retract the fork arms from under the car, and finally the piston and cylinder means 68 to lower the mast frame 83-84 to its FIG. 1 position.

There are some additional advantages of the present invention of which note should be taken here. One is that the operator is able to take a car disposed at ground level and bring it into the confines of the frame section 16 of the vehicle 10, and vice versa, without ever having to elevate the fork arms off ground level (except, of course, for the minimal elevation required for achieving a clearance between the bottom of the car and the ground). In the known side-loading fork lift trucks having raised platforms for supporting on-loaded objects, this advantage is clearly not achievable. Moreover, such known trucks must be provided with special counter-balancing, stabilizing and load distribution means during on-loading and off-loading, because of the fact that the use of such raised platforms requires the load to be lifted to a substantial elevation away from the center of gravity of the truck before it can be deposited on a receiving surface, either the ground or the platform or a stack.

In the fork lift vehicle of the present invention, it will be noted, the location of the heaviest components of the vehicle on the side of the longitudinal beam 17 provides a basic degree of counter-balancing for the vehicle. This per se is, of course, a well known expedient in side-loading fork lift trucks. However, the lowering of the frame section 16 to rest flat on the ground during on-loading and off-loading, which has not been known or used prior to the present invention, imparts to the vehicle 10 a degree of stability heretofore not achieved in the known side-loading fork lift trucks. Thus, the need for using outriggers or other special counter balancing, stabilizing and load distribution means has been effectively obviated. By virtue of this feature, furthermore, the vehicle 10 of the present invention can be adapted to lifting heavy loads such as junked or wrecked cars to and from heights of as much as 30–35 feet, which requires only the provision of a multisection telescoping mast.

What is claimed is:

1. A side-loading fork lift vehicle for handling a heavy load which is long relative to its width, said vehicle comprising:
   a. an elongated vehicle body having front and rear ends and opposite sides, front and rear ground wheels with independent axles, and respective vertical hydraulic piston and cylinder units interposed between said axles and said front and rear ends of said vehicle body for mounting the latter on said wheels;
   b. respective motor means for driving said front and rear ground wheels in forward and reverse, and means for controlling the orientations of said front and rear ground wheels through respective 180° arcs composed of 90° arcs to either side of a line parallel to the longitudinal axis of said vehicle body for enabling movement of the vehicle in either straight ahead mode or lateral translation mode or radius turning mode or crabwise mode in either the forward or the reverse direction;
   c. said vehicle body including (i) an elevated operator's cab at said rear end, of said vehicle body and (ii) an elongated, substantially rectangular load-carrying frame section arranged between said operator's cab and said front end of said vehicle body, said frame section including respective longitudinal beam means at said opposite sides of said vehicle body and a pair of spaced, parallel transverse beam means in the mid-region of said frame section and extending from one of said longitudinal beam means at one side of said vehicle body past the other of said longitudinal beam means at the other side of said vehicle body so as to have an end region located laterally outwardly of said vehicle body, said longitudinal and transverse beam means being disposed in a plane below that of said operator's cab and below that of said front end of said vehicle body, and said hydraulic piston and cylinder units being operable to maintain said beam means elevated above the ground when the vehicle is to be in motion and to lower said beam means to rest on the ground when the vehicle is to be stationary during an on-loading or off-loading operation;
   d. guideway means on said transverse beam means an extending along the latter, a trolley mounted on said guideway means between said transverse beam means for reciprocal movement therealong, and first hydraulic piston and cylinder means mounted on said frame section for moving said trolley along said guideway means; and
   e. load-handling means arranged on said trolley and including a vertical framework carried by said trolley, mast means mounted in said framework for vertical up and down movement relative thereto, second hydraulic piston and cylinder means mounted on said trolley for moving said mast means up and down, and a plurality of fork arms carried by said mast means and extending therefrom in a direction away from said one side of said vehicle body, said fork arms being adapted, upon an appropriate movement of said trolley, to be retracted to a position within the confines of said frame section or protracted to a position outside the confines of said frame section beyond said other longitudinal beam means.

2. A side-loading fork lift vehicle as claimed in claim 1, wherein said guideway means comprises upper and lower parallel flanges on each of said transverse beam means at the respective inwardly directed side thereof, the associated upper and lower flanges defining respective guide tracks, and the means for mounting said trolley on said guideway means comprises roller means carried by said trolley on the opposite sides thereof and disposed within the confines of said guide tracks, some of said roller means being in rolling contact with only said lower flanges, and others of said roller means being in rolling contact only with said upper flanges.

3. A side-loading fork lift vehicle as claimed in claim 2, wherein said roller means on each side of said trolley comprises four rollers with the two lower flange-contacting rollers being in staggered relation to and in an alternating sequence with the two upper flange-contacting rollers.

4. A side-loading fork lift vehicle as claimed in claim 1, further comprising linkage means connected between said trolley and said one longitudinal beam means, said first piston and cylinder means being articulated to said linkage means for exerting forces thereon to move said trolley along said guideway means.

5. A side-loading fork lift vehicle as claimed in claim 1, further comprising means pivotally mounting said framework on said trolley, and third piston and cylinder means articulated between said trolley and said framework for selectively tilting the latter and thereby also said mast means and said fork arms forwardly or rearwardly relative to the vertical.

6. A side-loading fork lift vehicle as claimed in claim 1, wherein the piston rods of said piston and cylinder units are rotatable about their respective axes and each piston rod extends downwardly out of its associated cylinder and is connected with the axle of the associated ground wheel, and further comprising means operatively connected with said piston rods for selectively rotating the same in one direction or the other about their axes.

7. A side-loading fork lift vehicle as claimed in claim 6, wherein said means for rotating said piston rods comprises a respective sprocket wheel affixed to each piston rod, a respective pair of sprocket chains trained about said sprocket wheels at said front and rear ends of said vehicle body, and fourth piston and cylinder means interconnecting each end of each sprocket chain with a corresponding end of the other sprocket chain at the same end of said vehicle body.

8. A side-loading fork lift vehicle as claimed in claim 1, wherein each of said hydraulic piston and cylinder units, upon all of said units having been operated to lower said beam means to rest on the ground, is further operable individually to elevate its associated wheel axle so as to raise the respective ground wheel mounted thereon off the ground for enabling repair or replacement of that ground wheel or of a tire constituting a part thereof.

9. A side-loading fork lift vehicle as claimed in claim 1, wherein said operator's cab is located at said other side of said vehicle body and includes a platform for supporting an operator of the vehicle, said platform extending laterally outwardly of said vehicle body substantially as far past said other longitudinal beam means as said transverse beam means, thereby to position the operator, during operation of the vehicle, so as to have a direct line of sight view of the laterally outwardmost end region of said transverse beam means.

* * * * *